W. D. CROAKER.
ENVELOP MOISTENER.
APPLICATION FILED JUNE 14, 1918.
1,287,246.
Patented Dec. 10, 1918.
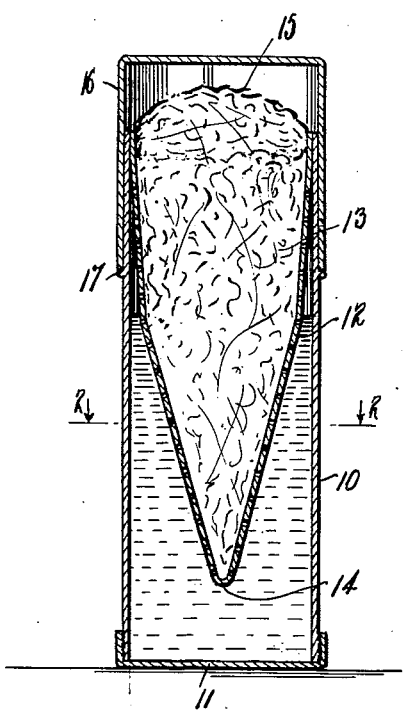
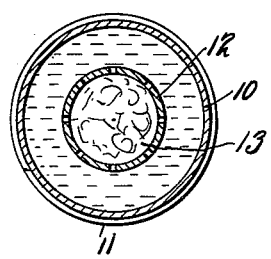
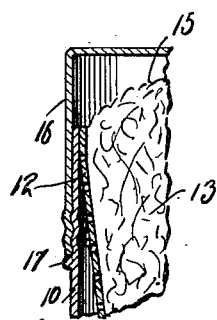
INVENTOR
Wellmonde D. Croaker
WITNESSES
BY
ATTORNEY

UNITED STATES PATENT OFFICE.

WELLMONDE D. CROAKER, OF GLENCARA, WARRA VIA DALBY, QUEENSLAND, AUSTRALIA.

ENVELOP-MOISTENER.

1,287,246.　　　　Specification of Letters Patent.　　Patented Dec. 10, 1918.

Application filed June 14, 1918. Serial No. 240,003.

*To all whom it may concern:*

Be it known that I, Mr. WELLMONDE D. CROAKER, a subject of the King of Great Britain, residing at Glencara, Warra via Dalby, Queensland, Australia, have invented certain new and useful Improvements in Envelop-Moisteners, of which the following is a specification.

This invention relates to an envelop moistener, and has for its object to provide a simple, convenient and useful article for moistening the gummed edges of envelops before sealing the same, the device being of such size as to be easily held in the hand and rapidly pass over the gum with rapidity and assuring thorough moistening of the gum and complete closure of the envelop when the flap is closed over the body.

With this object in view, the invention consists in the novel construction, combination and arrangement of parts, hereinafter described, pointed out in the appended claims and illustrated in the accompanying drawings, in which:

Figure 1 is a central longitudinal sectional view of the envelop moistener of the present invention, and, Fig. 2 is a cross sectional view on the line 2—2.

Fig. 3 is a sectional view of the upper end of the device showing a modification.

In the drawings, 10 indicates a tubular container, preferably though not necessarily of cylindrical form and which may be made of metal, glass or other suitable material. One end of the container is open and the other closed, either permanently by an integral bottom or by a cap 11 screwed on the bottom as shown.

Within the container is a cage 12 made of perforated or reticulated metal for the reception of a sponge 13 that absorbs water through the perforated walls of the cage 12 from the container 10. The cage 12 fits snugly at its upper end against the inner walls of the container at the open top and may be secured rigidly therein or made removable therefrom. The sides of the cage have a slight inward taper as they extend downwardly into the container which taper extends for about half the length of the cage after which the cage continues in a conical shape terminating near the bottom 11 in a blunt point 14. The sponge 13 projects at 15 a short distance beyond the mouth or open end of the container to enable the same to be readily applied to the gummed edge of an envelop flap for the purpose of moistening the gum thereon. Within the cage the sponge fills the entire space extending downwardly to the pointed end 14.

For the purpose of preventing evaporation of the moisture and so cause the projecting portion 15 of the sponge to dry, the container is provided with a closure 16 adapted to slide easily over the open end of the container and rest at its lower end on a circumferential rib 17 formed on the exterior of the container. If preferred, the closure 16 may be threaded on the upper end of the container as shown in Fig. 3.

The use of the device is self evident. The container is filled nearly to its top with water and a sponge placed within the cage with its end projecting at as 15. Water passes into the cage through the perforations therein and maintains the entire sponge in a moist condition and ready for use at all times. When not employed, the closure 16 will be placed over the projecting end of the sponge 15.

Having described my invention, I claim:

1. An envelop moistener comprising a container for holding water and open at one end, a conical cage having perforated walls placed within the container and fitting closely against its inner sides at the open end, and absorbent material filling said cage and projecting beyond the open end of the container.

2. An envelop moistener comprising a container open at one end and adapted to contain water, a hollow conical cage having perforated walls and open at its base, said base fitting snugly against the inner sides of the container at its open end, absorbent material filling said cage and projecting beyond the open end of the container, said material being maintained in a moist condition by absorbing water from the container through the perforated walls of the cage, and a closure for the open end of the container.

3. An envelop moistener comprising a container open at one end and having a removable cover for the opposite end and adapted to be filled with water, a hollow conical cage within the casing, said cage having perforated walls, an open base fitting snugly against the sides of the container at its open end and extending at its apex nearly to the bottom of the container, a sponge within the cage and filling the same and adapted to absorb water through the perforated walls of the cage, said sponge projecting beyond the open end of the container, a closure for the container covering said sponge, and a rib on the container to form a stop for the closure.

In testimony whereof I affix my signature in presence of two witnesses.

WELLMONDE D. CROAKER.

Witnesses:
WM. R. WILLIAMSON,
J. H. McKAIL.